(12) United States Patent
Susnjara

(10) Patent No.: US 8,412,583 B2
(45) Date of Patent: Apr. 2, 2013

(54) METHOD FOR PRODUCING CUSTOM COMPOSITE PRODUCTS

(75) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 309 days.

(21) Appl. No.: 12/755,514

(22) Filed: Apr. 7, 2010

(65) Prior Publication Data
US 2011/0251912 A1 Oct. 13, 2011

(51) Int. Cl.
*G06Q 30/00* (2012.01)
(52) U.S. Cl. .................... 705/26.1; 705/27.1
(58) Field of Classification Search ............ 705/26, 705/27, 26.1, 27.2
See application file for complete search history.

(56) References Cited

U.S. PATENT DOCUMENTS

| 6,580,963 | B2 * | 6/2003 | Susnjara ............... 700/171 |
| 7,542,925 | B2 * | 6/2009 | Tung .................... 705/26.2 |
| 2005/0257437 | A1 * | 11/2005 | Juten et al. ............ 52/36.1 |

OTHER PUBLICATIONS

Thermwood Reports Fiscal Second Quarter Sales and Earnings, PR Newswire [New York] Mar. 5, 1998, downloaded from ProQuestDirect on the Internet on Nov. 17, 2012, 1 pages.*
Linking design & manufacturing: CAE CAE, Beckert, Beverly A. Computer—Aided Engineering13. 10 (Oct. 1994): 46, downloaded from ProQuestDirect on the Internet on Nov. 17, 2012, 5 pages.*
Embracing technology in the small shop, Phillips, E M; Plantz, Bruce. CabinetMaker15. 6 (May 2001): 26-31, downloaded from ProQuestDirect on the Internet on Nov. 17, 2012, 4 pages.*

* cited by examiner

*Primary Examiner* — James Zurita
(74) *Attorney, Agent, or Firm* — Novak Druce Connolly Bove + Quigg

(57) ABSTRACT

A method of producing a product composed of a set of components generally consisting of providing certain raw materials suitable to produce such components; providing a CNC machine operable upon suitable programming to produce the components from the raw materials; providing programming for the machine suitable for forming the components from the raw materials; soliciting the sale of the components to a prospective customer intended for assembly by the customer in producing the product; producing the components from the raw materials, utilizing the machine suitably programmed upon the sale of the components to the customer; and delivering the components to the customer for assembly thereof by the customer to produce the product composed of the components.

18 Claims, 2 Drawing Sheets

METHOD FOR PRODUCING CUSTOM COMPOSITE PRODUCTS

This invention relates to an improved method for producing a product composed of a set of selectively configured components in which such components are produced by a first party which are sold to a second party and assembled by the second party to produce the final product.

BACKGROUND OF THE INVENTION

Traditionally, it has been the general practice of retailers offering for sale large volume products such as cabinets, cases, chests, tables and the like to purchase such products from suppliers, inventory and display such products on their premises, advertise them for sale to prospective consumers and sell them to such consumers. Such practice, however, has been found to be excessively burdensome, often ineffectual and uneconomical. Such practice has been found to be excessively burdensome because it requires the transportation and handling of a number of large products of diverse configurations, dimensions and weights which require considerable floor space for storage and display, and ineffectual in that the selected types, mixes, designs and dimensions of such products might not appeal to or meet the requirements or specifications of prospective purchasers. Such practice also tends to be uneconomical in that the retailer incurs the expense of the production and overhead costs, freight charges and profit of the supplier, the increased space of the retailer for storing and displaying the products and possibly discounting the price of or discarding poorly selling or otherwise nonselling products.

A pertinent aspect of the present invention is the fact that a segment of the general public has an interest in a craft such as woodworking, particularly as a hobby. Although many of such persons may have various woodworking skills, they generally do not have access to advanced woodworking equipment required to precisely cut and shape wood pieces for building desired products. Furthermore, operating such equipment requires unique skills, knowledge and time normally not available to the general public.

It therefore is the principal object of the present invention to provide a novel method by which a retailer of a line of products may provide such products in an unfinished form to purchasers which then may be finished by such purchasers, and in which an increase and wide variety of products of different designs, configurations and dimensions are made available, such line of products may be readily and instantly revised from time to time in terms of type, design, configuration and dimensions in responding to public demand, the storage and display floor space of such products may be substantially reduced, the discounting and discarding of slow moving, discontinued and obsolete products may be instantaneously eliminated, the profitability of the retailer would be materially enhanced, custom specifications would be available to purchasers and the cost of such products to the purchaser would be more affordable.

SUMMARY OF THE INVENTION

The principal object of the present invention is achieved by a method of producing a product composed of a set of components, generally consisting of providing a first party such as a retailer of such components, certain raw materials suitable to produce such components; providing such first party a CNC machine operable upon suitable programming to produce the components from such raw materials; providing such first party programming for such machine suitable for forming the components from such raw materials; soliciting the sale of such components to a second party such as a prospective purchaser, intended for assembly by such purchaser in the production of such products; producing such components from the raw materials by such first party, utilizing such machine suitably programmed upon the sale of such components to such purchasers; and delivering such components to such purchaser for assembly thereof by the purchaser to produce the product composed of such components.

DETAILED DESCRIPTION OF THE PREFERRED EMBODIMENTS OF THE INVENTION

Figure 1:
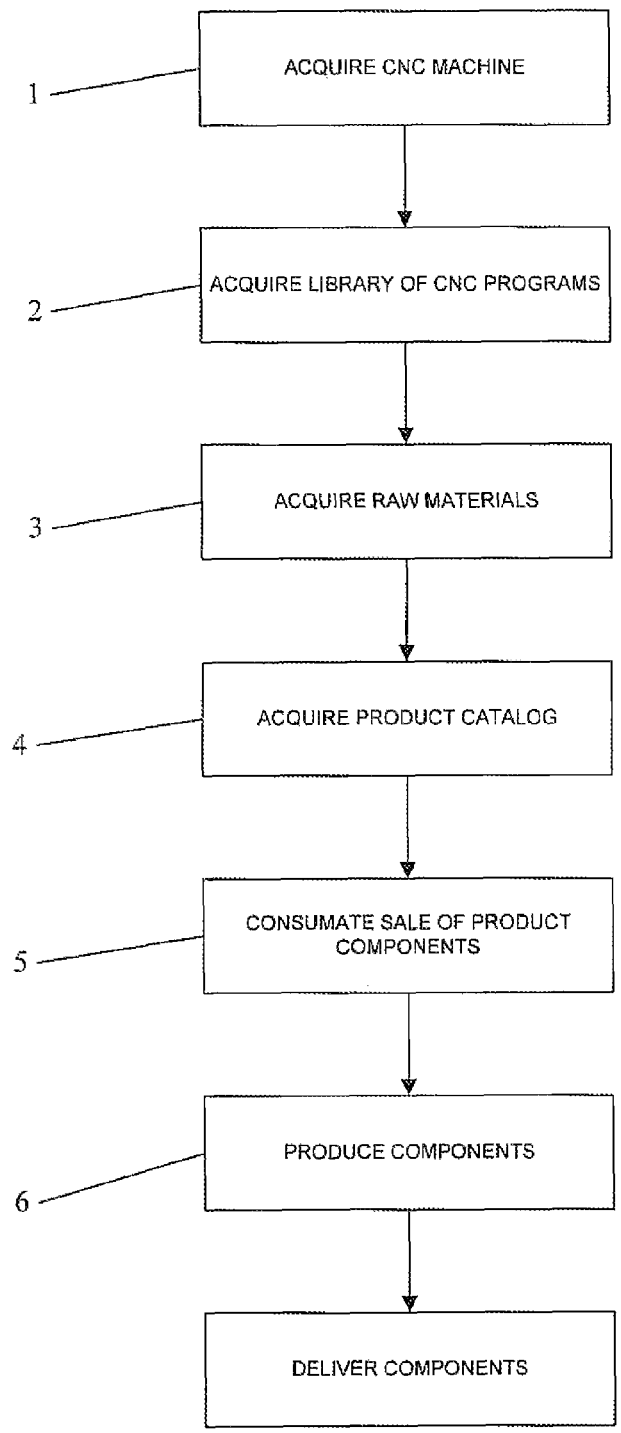
FIG. 1 is flow diagram of the method of the invention.
Figure 2:
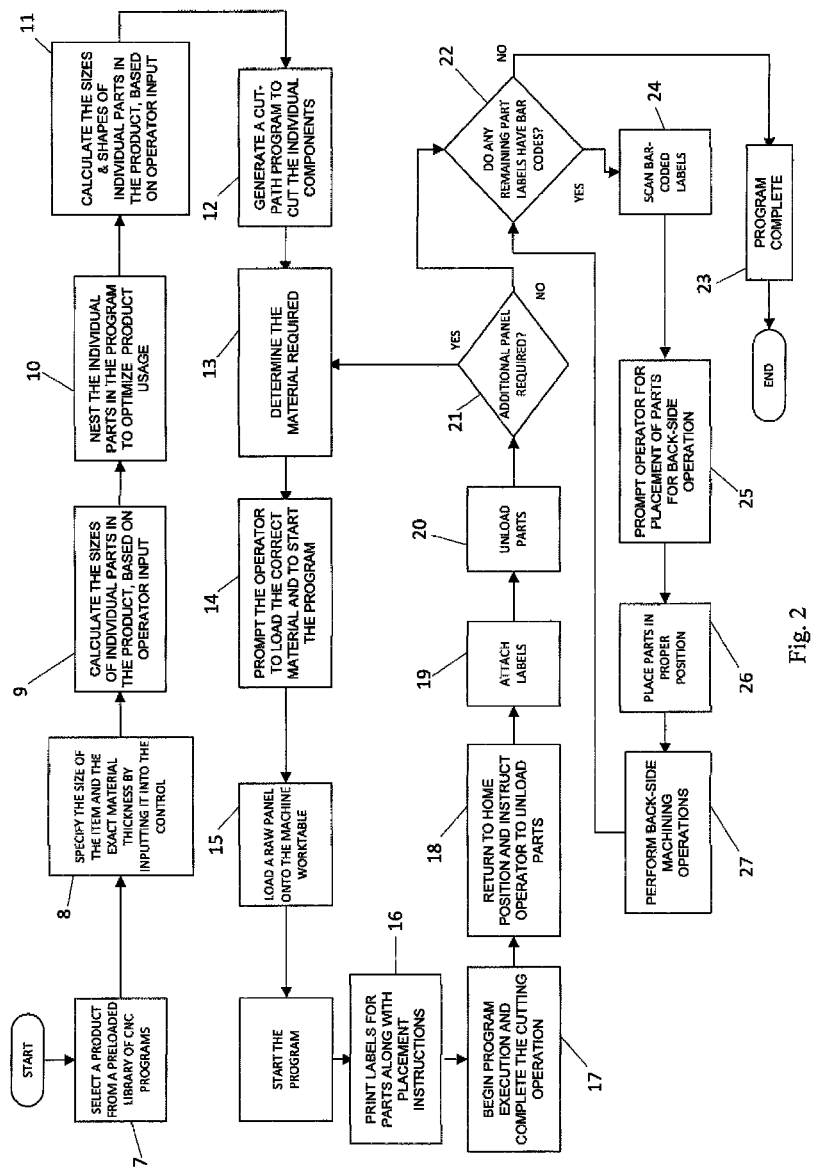
FIG. 2 is a flow diagram consisting of a portion of the method shown in FIG. 1, indicating the function of the machine in the method shown in FIG. 1.

Referring to FIGS. 1 and 2 of the drawings, there is shown a series of steps to be taken in practicing an embodiment of the present invention. Such embodiment, as an example, provides for the production by a first party such as a retailer of a set of components made of a wood material which are sold to and assembled by a second party such as a consumer in which the consumer is intended to assemble and finish an end product such as a cabinet, a case, a chest, a credenza, a table, other types of furniture and the like. The retailer could be a home improvement entity which sells a variety of products for residential or commercial use, and the purchaser could be a homeowner or the owner of a business establishment.

In steps 1 and 2, a retailer deciding upon entering into the business contemplated by the method, initially would acquire and presumably situate at its premises, a CNC router for machining the components of the products to be offered, and a suitable library of programs for operating such machine. Such a machine typically consists of a base member supporting a worktable on which panels of raw material to be machined may be loaded, and one or more cutting tools which may be displaced along x, y and z axes to cut and form a number of components from a panel loaded on such worktable, of various sizes and profiles. Such machines and appropriate programs may be purchased or leased from a number of manufacturers and software developers and would be of a type and nature sold and leased by the Thermwood Corporation of Dale, Ind. In steps 3 and 4, the retailer would acquire the raw material for producing such components and presumably store such material on its premises, and further develop or otherwise acquire a sales catalog corresponding to the products which may be assembled from components produced with such machine, to be assembled by purchasers. Essentially, the raw material would consist of wooden panels of prescribed lengths, widths and thicknesses which will be purchased from suitable suppliers and stored on the retailer's premises at a location accessible to an operator of the machine on which the panels are intended to be loaded and machined. A catalog of the products to be assembled with the components to be offered, and for use by sales personnel of the retailer can be developed by the retailer or a vendor including the developer of the library of programs.

In step 5, sales personnel of the retailer would provide prospective purchasers access to the catalog of offered products, such purchasers would select one or more products from such catalog, provide the requested dimensions of the selected products and consummate the sale for the purchase of the selected products. A work order with prescribed dimensions of the selected product then would be sent to the machine operator who would select the appropriate panels from inventory, load them onto the machine and designate the appropriate program for machining the components of the selected products. The catalog of offered products can be in print form available to prospective purchasers visiting the premises of the retailer or may be made available online. Correspondingly, orders may be placed at the retailer's premises or online in the conventional manner. In producing the components of the selected products pursuant to step 6, the procedure as indicated in steps 7 through 27 shown in FIG. 2 are performed by the machine operator and the machine.

In machining the components for a selected product, as indicated in the steps shown in FIG. 2, the program for producing the components of a selected product is selected from a preloaded library of CNC cut programs. In step 8, the specific size of the product and the exact material thicknesses of the components of the product are inputted into the control of the machine. The machine then calculates the sizes of individual components of the product, based on the operator input, in step 9. Next, in step 10, the machine functions to nest the individual components in the program to optimize the usage of the raw material used to produce the required components. In step 11, the machine then calculates the sizes and shapes of the various components of the products, based on the input of the machine operator. Upon calculating such sizes and shapes, the machine functions in step 12 to generate a cut path program to produce the several components. The machine then determines the material required in step 13 and the operator is prompted to load the appropriate material onto the machine to start the program, in step 14. The machine operator then loads a panel onto the worktable of the machine in step 15 and the machine is started to execute the cut path program. In step 16, the machine then prints out labels with bar code information for parts, along with placement instructions. The program execution is then begun in step 17 and the machine performs the cutting operation on the panel loaded on the worktable of the machine.

Once the machining has been completed, the cutting tool or tools of the machine are returned to their home positions and the machine instructs the operator to unload the parts, as provided in step 18. In step 19, the labels with the bar codes produced by the machine are then read to determine the applicable components and such labels are attached to appropriate parts on the worktable having been produced. The parts are then unloaded from the machine and a determination is made as to whether additional panels are to be loaded onto the worktable of the machine. If so, steps 8 through 21 are repeated to produce the additional components. It then is determined in step 22 whether any remaining part labels have bar codes. If not, the machining procedure is completed and the produced components are packaged to be provided to the purchaser of such components. If such produced components are provided with labels having bar codes, such codes would be scanned in step 24, the operator would be prompted in step 25 to place such parts on the work table of the machine for an operation on the backside of the parts, such parts will be placed on the worktable of the machine in step 26 and the machine further would be operated to perform the machining operations on the backs of such parts in step 27.

Once the components have been machined, they are gathered and packaged by the operator and returned to sales personnel of the retailer for delivery of the components to the respective purchaser. The purchaser may then undertake to assemble the components into a final product at the purchaser's residence or place of business, perhaps with the use of a set assembly instructions, hardware and finishing materials available from the retailer.

By use of the described method, the retailer and the customer of the retailer benefit in several respects. The retailer benefits in that with the acquisition of a CNC router, a library of programs for operation of such router and a catalog of products that may me produced corresponding to such products, and the operation of such machine, the retailer saves the cost of a supplier of such products in terms of such supplier's labor costs, operating expenses and profits in producing the finished product, the cost of storing and displaying fully assembled products on the premises of the retailer and the possible cost of discounting or otherwise discarding slow moving or unsalable finished products. The customer of the retailer benefits from the method in that the customer saves the costs of the supplier of such finished products in terms labor costs, operating expenses and profits, and is able to obtain the components of a finished product of specified dimensions to suit its individual requirements. The assembly of such components into finished products further is facilitated by the exact dimensions of the components and the cutting patterns of the components which permits the acquired components to be easily and accurately fitted together to provide the finished product. The assembly and finishing of such products from the provided components would entail merely fitting and securing the parts together with adhesives and/or various fasteners, and finishing such assembled product by perhaps sanding, staining or painting.

In a typical transaction, a prospective purchaser would visit the premises of the retailer, engage the services of a sales personnel, select a product from a catalog of products provided by the sales personnel and place the order for the components of the product. The sales personnel would then prepare a work order for the production of the components for the product by the production department of the retailer. The work order then would be performed by the machine operator in obtaining the prescribed raw material panels from storage, producing such components on the acquired machine and then gathering and packaging and delivering such package of components to the sales personnel for delivery to the purchaser. Upon availability of such components, the purchaser would collect such package of components and deliver them to the customer's premises for assembly and ultimate use of the assembled product.

From time to time, the catalog of available products for which components would be offered can be revised to eliminate and/or add products. Concurrently with the revision of such catalogs, the library of programs for the production of the components of such products correspondingly would be revised. Such revised library of programs would be produced and made available by the initial provider of such library of programs.

The invention also provides purchasers of such unassembled products a number of significant benefits. An increased number and different designs of such end products would be available. Purchasers would be able to specify the dimensions of the end products and select the material of the products. The component parts would be accurately dimensioned and suitably configured to facilitate assembly. Finally, the cost of the end product would be reduced considerably.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A method of producing a product composed of a set of components, comprising:
   providing certain raw materials suitable to produce said components by a supplier to a producer;
   providing a CNC machine operable upon suitable programming to produce said components from said raw materials by said supplier to said producer;
   providing programming for said machine suitable for forming said components from said raw material by said supplier to said producer;
   soliciting and consummating the sale of said components to a prospective consumer by said producer intended for assembly by said consumer in producing of said product;
   producing said components from said raw materials, utilizing said machine suitably programmed upon the sale of said components to said consumers by said producer; and
   delivering said components by said supplier to said consumer for assembly thereof by said consumer to provide said product composed of said components.

2. The method according to claim 1 wherein the producer of said components is a retailer.

3. The method according to claim 2 wherein said raw materials are acquired by said retailer and stored in an area readily accessible to an operator of said machine.

4. The method according to claim 1 wherein said raw material is acquired by said retailer from any supplier.

5. The method according to claim 1 wherein said CNC machine and the program operable thereon is acquired by said retailer from a supplier of said machine, and operated by said retailer.

6. The method according to claim 1 including acquiring a catalog of products from which a prospective consumer may select a particular product to be assembled with said components, and wherein said CNC machine is programmed to operate to produce said components of said selected product.

7. The method according to claim 1 wherein said programming of said machine is functional to produce components of dimensions suitable for assembly of a product of prescribed dimensions.

8. The method of claim 1 wherein said raw material is one of a group consisting of wood and plastic.

9. The method of claim 8 wherein said raw material is in sheet form.

10. The method of claim 1 wherein said CNC machine comprises a router.

11. The method of claim 1 wherein said programming is functional subject to an indication of a selected product to calculate the sizes and shapes of the components of the selected product, determine the raw material requirements for cutting such components, and determine a nesting pattern of the sized components on the selected raw material item to be loaded on said worktable.

12. The method according to claim 11 including upon receipt of an order to purchase said components, operating said machine programmed as provided to designate the raw material requirement, loading the required raw material item on the worktable of said machine and initiating the operation of said machine to cut the components from said raw material items.

13. The method of claim 11 wherein in circumstances where machining operations are to be performed on opposite sides of the designated raw material item, said program is functional to generate a label with a bar code designating the positioning of said item on said worktable, and operates said machine upon scanning of said bar code to determine the positioning of said item on said worktable with said opposite side disposed upright, to perform said machining operation on said opposite side.

14. The method of claim 13 wherein upon completion of a machining operation on one side of said item to produce a set of components, the machine operator effects the scanning of said labels to determine the placement of items to be machined on opposite sides and concurrently instructs the machine of the operations to be performed, removes the machined items from said worktable, positions said labeled items back onto said worktable with opposite sides upright and positioned as designated on said labels, and restarts the operation of said machine to perform the required machining on the upright sides of said replaced items.

15. The method claim 6 including acquiring by a said producer from a said supplier a catalog of products corresponding to products that may be submitted to prospective purchasers.

16. The method of claim 15 including revising said catalogs by adding and/or deleting catalog items.

17. The method according to claim 16 including correspondingly revising said catalog of products.

18. The method of claim 1 including providing instructions by said producer to purchasers of said components for assembling said components.

* * * * *